(12) United States Patent
Ramprasad (10) Patent No.: US 9,553,993 B2
(45) Date of Patent: Jan. 24, 2017

(54) DEVICE AND PROCESS FOR SELECTING ONE OF A PLURALITY OF DIRECT INWARD DIALING NUMBERS

(71) Applicant: TracFone Wireless, Inc., Miami, FL (US)

(72) Inventor: Satish Ramprasad, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 0 days.

(21) Appl. No.: 14/611,738

(22) Filed: Feb. 2, 2015

(65) Prior Publication Data

US 2015/0222754 A1  Aug. 6, 2015

Related U.S. Application Data

(60) Provisional application No. 61/934,070, filed on Jan. 31, 2014.

(51) Int. Cl.
*H04M 3/54* (2006.01)
*H04W 4/16* (2009.01)
(Continued)

(52) U.S. Cl.
CPC ............. *H04M 3/541* (2013.01); *H04W 4/16* (2013.01); *H04W 40/20* (2013.01); *H04L 67/1004* (2013.01)

(58) Field of Classification Search
CPC ................ H04M 2203/2016; H04M 3/42314; H04M 3/4234; H04M 7/006; H04M 3/42102; H04M 15/06; H04M 15/63; H04M 15/755; H04M 3/42059; H04M 3/541; H04M 15/8033; H04M 15/8038; H04M 15/8044; H04M 15/8292; H04M 2215/016; H04M 2215/724; H04M 2215/7245; H04W 4/16; H04W 4/24; H04W 40/20; H04W 4/08; H04W 40/02; H04W 4/00; H04W 92/08; H04L 63/061; H04L 65/1069; H04L 67/1004
See application file for complete search history.

(56) References Cited

U.S. PATENT DOCUMENTS 7,397,796 B1 * 7/2008 Smiljani ............. H04L 49/1515
                                                  370/335
8,064,467 B2 * 11/2011 Lawrence ............... H04L 45/04
                                                  370/389

(Continued)

*Primary Examiner* — Nizar Sivji
(74) *Attorney, Agent, or Firm* — Baker Hostetler LLP (57) ABSTRACT

Selecting one of a plurality of direct inward dialing numbers for dialing an international number preceded by a direct inward dialing number is disclosed. A destination phone number to be dialed by a wireless device is initially received at the wireless device. It is then determined that the destination phone number is an international destination phone number. In response to the determination that the destination phone number is an international destination phone number, one direct inward dialing number is selected from among a plurality of direct inward dialing numbers. The selected one direct inward dialing number connects the wireless device to a server. Next, the wireless device dials the one selected direct inward dialing number and determines that a connection between the wireless device and the server has been established. Finally, the international destination phone number is forwarded to the server.

18 Claims, 4 Drawing Sheets

(51) Int. Cl.
*H04W 40/20* (2009.01)
*H04L 29/08* (2006.01)

(56) References Cited

U.S. PATENT DOCUMENTS

| 8,699,692 B2* | 4/2014 | Baumeister | H04M 3/4931 |
| | | | 379/221.01 |
| 2008/0181106 A1* | 7/2008 | Bertagnole | H04M 3/42263 |
| | | | 370/230.1 |
| 2010/0226362 A1* | 9/2010 | Kim | H04L 12/14 |
| | | | 370/352 |
| 2013/0210386 A1* | 8/2013 | Perlin | H04L 63/12 |
| | | | 455/411 |
| 2014/0050083 A1* | 2/2014 | Layman | H04L 12/56 |
| | | | 370/230 |
| 2016/0183229 A1 | 6/2016 | Nakai | |

* cited by examiner

DEVICE AND PROCESS FOR SELECTING ONE OF A PLURALITY OF DIRECT INWARD DIALING NUMBERS

CROSS REFERENCE TO PRIOR APPLICATIONS

This application claims the benefit from U.S. Provisional Application No. 61/934,070 filed on Jan. 31, 2014, which is hereby incorporated by reference for all purposes as if fully set forth herein.

TECHNICAL FIELD

The following disclosure generally relates to calling international phone numbers and, more particularly, relates to selecting one of a plurality of direct inward dialing numbers to connect a wireless device to a destination associated with an international telephone number.

BACKGROUND

Calling cards and international cellular calling plans typically require an international caller to dial a separate phone number, such as a local or toll-free phone number, before dialing an international phone number. These local or toll-free phone numbers provide a less costly method to place international phone calls by connecting callers to an exchange that can subsequently connect the caller to a destination associated with the desired international phone number. However, reliance on a single direct local or toll-free phone number can cause congestion at the corresponding exchange, thus preventing the caller from being able to complete the international call or resulting in a low quality connection.

Therefore, a new method and system for utilizing direct inward dialing numbers to connect the wireless device to the destination associated with the international telephone number to increase the likelihood of the international caller successfully connecting to the international destination is needed.

SUMMARY

Selecting one of a plurality of direct inward dialing numbers for dialing an international number preceded by a direct inward dialing number is disclosed. A destination phone number to be dialed by a wireless device is initially received at the wireless device. It is then determined that the destination phone number is an international destination phone number. In response to the determination that the destination phone number is an international destination phone number, one direct inward dialing number is selected from among a plurality of direct inward dialing numbers. The selected one direct inward dialing number connects the wireless device to a server. Next, the wireless device dials the one selected direct inward dialing number and determines that a connection between the wireless device and the server has been established. Finally, in response to the determination that the connection between the wireless device and the server has been established, the international destination phone number is forwarded to the server.

In some aspects, one or more available direct inward dialing numbers can be received in response to the determination that the destination phone number is an international destination phone number. In some aspects, the plurality of direct inward dialing numbers can be stored on the wireless device, such as on a memory of the wireless device, on a subscriber identification module card of the wireless device, and/or in an application stored on the memory of the wireless device. The direct inward dialing numbers can be added or removed to or from the wireless device.

In some aspects, the load between each of direct inward dialing numbers can be balanced. For example, each of the plurality of the direct inward dialing numbers can be sequentially dialed. In another example, a load on each server associated with each of the plurality of direct inward dialing numbers can be received and the one direct inward dialing number associated with the server having the lowest load can be selected.

In some aspects, it can be determined that the destination phone number is not an international destination phone number. In response to the determination that the destination phone number is not an international destination phone number, the wireless device can dial the destination phone number without selecting the one direct inward dialing number.

In some aspects, a first direct inward dialing number can be dialed by the wireless device. It can then be determined that the first direct inward dialing number is unavailable. In response to the determination that the first direct inward dialing number is unavailable, a second direct inward dialing number can be selected, where the second direct inward dialing number being different from the first direct inward dialing number. A signal received from a server associated with the first direct inward dialing number can indicate that the server is unavailable.

In some aspects, the one selected direct inward dialing number can be dialed without human interaction or augmentation and/or the international destination phone number can be forwarded without human interaction or augmentation. The server can be, for example, a private branch exchange system.

A wireless device comprising at least one processor connected to at least one memory is also disclosed. The at least one processor is configured to receive a destination phone number to be dialed by the wireless device and determine that the destination phone number is an international destination phone number. In response to the determination that the destination phone number is an international destination phone number, the at least one processor is configured to select one direct inward dialing number from among a plurality of direct inward dialing numbers. The one direct inward dialing number connects the wireless device to a server. Next, the at least one processor is configured to dial the one selected direct inward dialing number and determine that a connection between the wireless device and the server has been established. In response to the determination that the connection between the wireless device and the server has been established, the at least one processor is configured to forward the international destination phone number to the server.

A non-transitory memory of a wireless device storing a computer program is also disclosed. The computer program includes one or more code segments that, when executed, cause at least one processor to receive a destination phone number to be dialed by the wireless device and determine that the destination phone number is an international destination phone number. In response to the determination that the destination phone number is an international destination phone number, the one or more code segments cause the at least one processor to select one direct inward dialing number from among a plurality of direct inward dialing numbers. The one direct inward dialing number connects the wireless device to a server. Next, the one or more code segments cause the at least one processor to dial the one selected direct inward dialing number and determine that a connection between the wireless device and the server has been established. In response to the determination that the connection between the wireless device and the server has been established, the one or more code segments cause the at least one processor to forward the international destination phone number to the server.

Details of one or more aspects of selecting one of the plurality of direct inward dialing numbers to connect the wireless device to the destination associated with the international telephone number are set forth in the accompanying drawings and the description below. Other aspects of selecting one of the plurality of direct inward dialing numbers to connect the wireless device to the destination associated with the international telephone number will be apparent from the description and drawings, and from the claims.

DESCRIPTION OF DRAWINGS

Like reference symbols indicate like elements throughout the specification and drawings.

DETAILED DESCRIPTION

Figure 1:
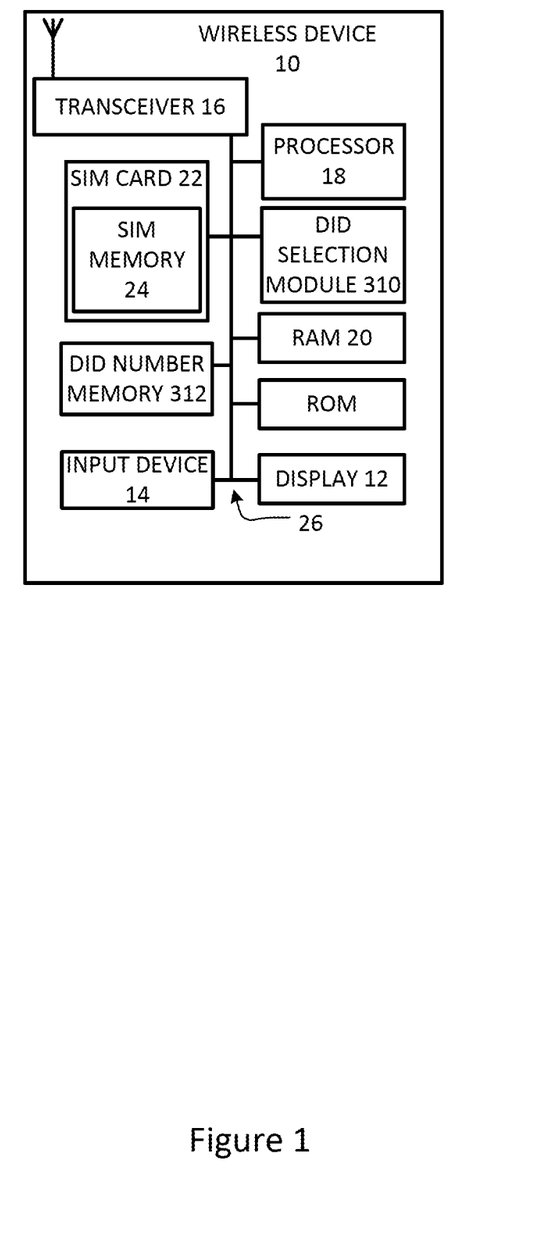
FIG. 1 illustrates a block diagram of an exemplary wireless device according to aspects of the disclosure.

FIG. 1 illustrates a block diagram of an exemplary wireless device 10 according to aspects of the disclosure. The wireless device 10 can be any mobile technology computing device that connects to a wireless communication network such as, for example, a mobile phone, a wireless handset, a wireless dongle, user equipment, a mobile station, or the like. The wireless device 10 includes a display 12, an input device 14, a transceiver 16, a processor 18, a memory 20, and may include a Universal Integrated Circuit Card ("UICC") or Subscriber Identification Module ("SIM") card 22. In some implementations, the SIM card 22 can be removably received within a card slot (not shown) in the wireless device 10 and can include internal SIM memory 24. The SIM card 22 can store information such as an International Mobile Subscriber Identity ("IMSI"), a key used to identify and authenticate subscribers using the wireless device 10, or the like. The SIM card 22 can be configured to be transferred between different wireless devices 10. In other aspects, the wireless device 10 operates without a UICC or SIM card 22.

The processor 18 is capable of processing instructions for execution within the wireless device 10. For example, the processor 18 can process instructions stored in the memory 20 to display graphical information on the display 12 and/or to transmit or receive data using the transceiver 16. The processor 18 can be a single-threaded processor or a multi-threaded processor. The memory 20 can include, for example, volatile or non-volatile random access memory ("RAM") and/or read only memory ("ROM"). The components 12, 14, 16, 18, and 20 within the wireless device 10 may communicate through an internal bus 26.

Figure 2:
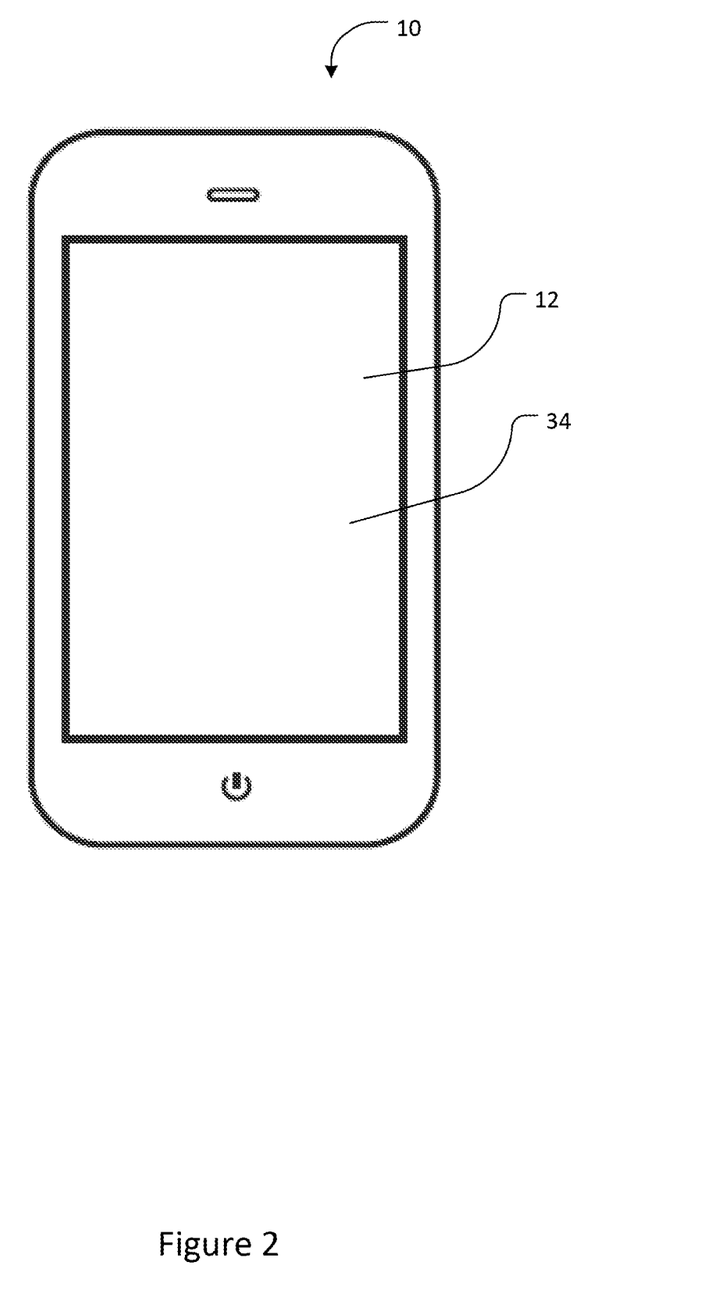
FIG. 2 illustrates an exemplary wireless device according to aspects of the disclosure.

FIG. 2 illustrates an exemplary wireless device 10 according to aspects of the disclosure. The wireless device 10 may include a display 12 that is a screen that can be touch sensitive. The input device 14 can include one or more of a keypad, a trackball, selectable buttons, a touch screen 34 having selectable regions, or the like. In some aspects, the touch screen 34 may replace the one or more of the keypad, trackball, element and selectable buttons. The wireless device 10 may also include an antenna (not shown) coupled to the transceiver 16 to facilitate the transmission and receipt of communications by the wireless device 10.

Figure 3:
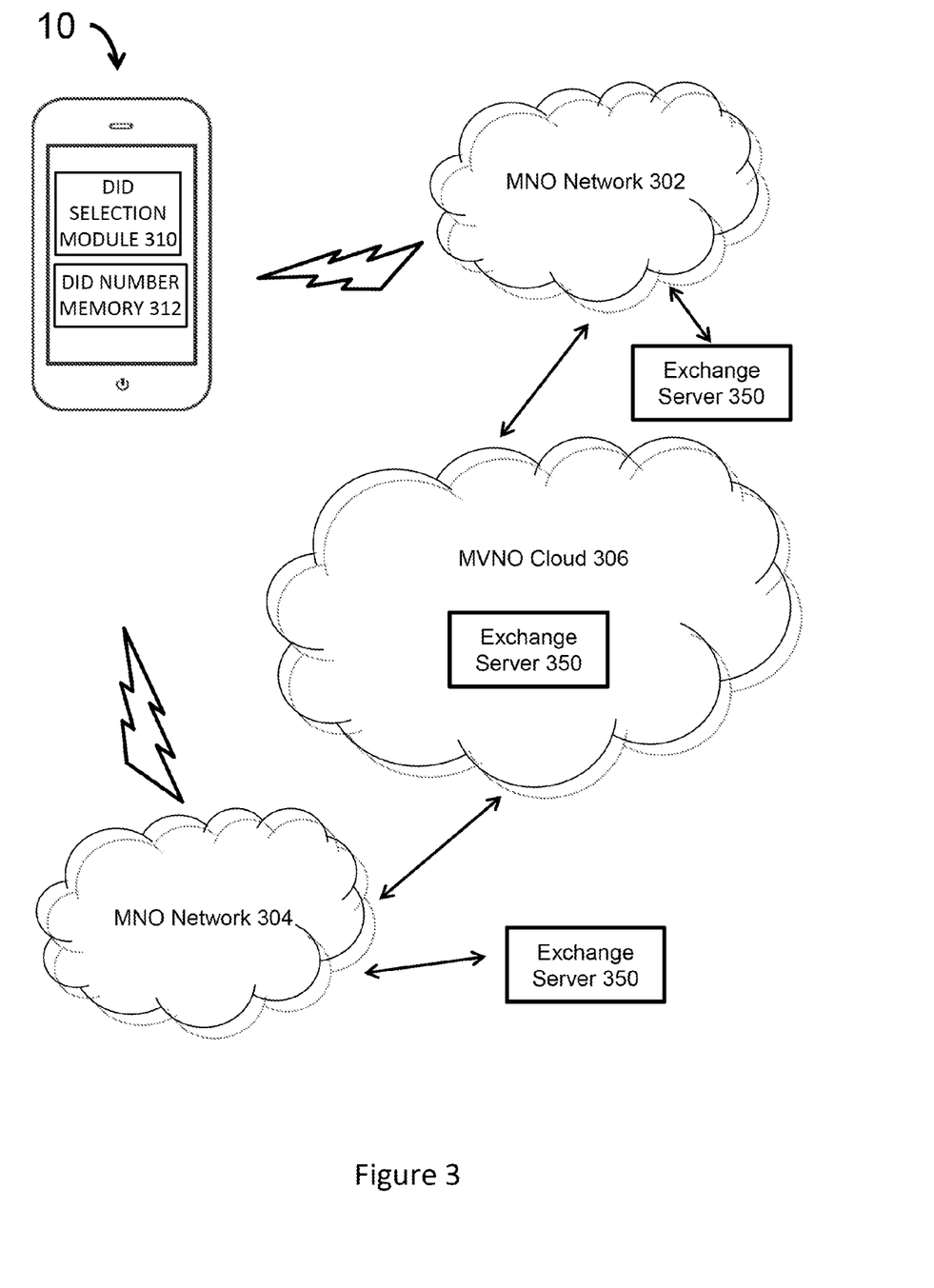
FIG. 3 illustrates a schematic diagram showing the connectivity between a wireless device, a plurality of mobile network operators, and a mobile virtual network operator according to aspects of the disclosure.

FIG. 3 illustrates a schematic diagram showing the connectivity between a wireless device 10, a plurality of mobile network operators ("MNO") networks 302 and 304, and a mobile virtual network operator ("MVNO") cloud 306 according to aspects of the disclosure. In some aspects, the MVNO cloud 306 may be optional. Although two MNO networks 302 and 304 are illustrated in FIG. 3, any number of MNO networks can be available. The wireless device 10 may connect to one of the MNO networks 302 and 304 depending on the geographic location of the wireless device 10, the availability of the MNO networks 302 and 304, and/or the service contract associated with the wireless device 10. The MNO networks 302 and 304 can be any type of wireless network utilizing a communications channel, such as a cellular data network, e.g., a Global System for Mobile Communication ("GSM") network, a Code-Division Multiple Access ("CDMA") network, an Universal Mobile Telecommunications System ("UMTS") network, an Evolution-Data Optimized ("EV-DO") network, a Long Term Evolution ("LTE") network, a wireless local network, a wide area network, and/or the like.

The MNO networks 302 and 304 can connect the wireless device 10 to an exchange server 350 that can connect the wireless device 10 to a destination associated with an international destination phone number. The exchange server 350 can be, for example, a private branch exchange system, a fax server, or the like. The exchange server 350 can receive an international destination phone number from the wireless device 10 and then dial the international destination phone number to connect to the destination associated with the international destination phone number. As such, the exchange server 350 can act as an intermediary connecting the wireless device 10 to the destination associated with an international destination phone number.

In some aspects, a wireless subscriber purchases a wireless communications plan from an MVNO. The MVNO is a wireless operator that typically does not own its own frequency spectrum or have its own network infrastructure. Instead, MVNOs contract for the right to access a wireless communications network owned by a MNO and sell that access to their wireless subscribers. Therefore, to provide activation, metering, additional services, and other customer services to their subscribers, MVNOs operate systems, such as the MVNO cloud 306, that communicate with the MNO networks 302 and 304.

The MVNO cloud 306 may communicate with the MNO networks 302 and 304 to receive information about and from the wireless device 10 on the MNO networks 302 and 304. The MVNO cloud 306 can be one or more of dedicated hardware, application specific integrated circuits, programmable logic arrays, computers, and servers including one or more processors and one or more memories.

In some aspects, the exchange server 350 can be included as part of the MVNO cloud 306. In such aspects, the MVNO cloud 306 including the exchange server 350 can act as the intermediary connecting the wireless device 10 to the destination associated with an international destination phone number.

A Direct Inward Dialing ("DID") Number Selection Module 310 may be included in the wireless device 10 and may be pre-installed or post-installed on the wireless device 10. The DID Number Selection Module 310 may be stored or executed on, for example, the memory 20, the UICC/SIM memory 24, dedicated hardware, application specific integrated circuits, programmable logic arrays, the MVNO cloud 306, and/or the processor 18 of the wireless device 10. A plurality of DID numbers may be stored in the DID Number Selection Module 310 and/or outside of the DID Selection Module 310. In some aspects where the plurality of DID numbers are stored in the wireless device 10, the plurality of DID numbers may be stored in, for example, the DID memory 312 of the DID Selection Module 310, the memory 20, in an application stored in the memory 20, and/or the SIM memory 24 of the wireless device 10.

In some aspects where the plurality of DID numbers are stored outside of the wireless device 10, the plurality of DID numbers may be stored in the MVNO cloud 306, in the MNO Network 302 or 304, and/or in a non-transitory memory accessible to the wireless device 10. One or more of the plurality of DID numbers may be provided to the wireless device 10 in response to a request from the wireless device 10, in response to a particular action at the wireless device 10, such as the reception of an international destination phone number, and/or at predetermined time intervals. In some aspects, all of the plurality of the DID numbers may be provided to the wireless device 10, and the wireless device 10 can select one of the plurality of the DID numbers to dial. In other aspects, one DID number from among the plurality of DID numbers, such as the DID number having the lowest load and/or the largest remaining capacity, may be provided to the wireless device 10 for dialing.

The DID Number Selection Module 310 may be used to connect the wireless device 10 to an exchange server 350 included in the MVNO cloud 306 or to an exchange server 350 that is accessible through the MNO Network 302 or 304. The DID Number Selection Module 310 selects one of the plurality of DID numbers without user interaction or augmentation. Following confirmation of a connection between the wireless device 10 and the exchange server 350, the wireless device 10 forwards an international destination phone number to the exchange server 350 also without user interaction or augmentation.

Figure 4:
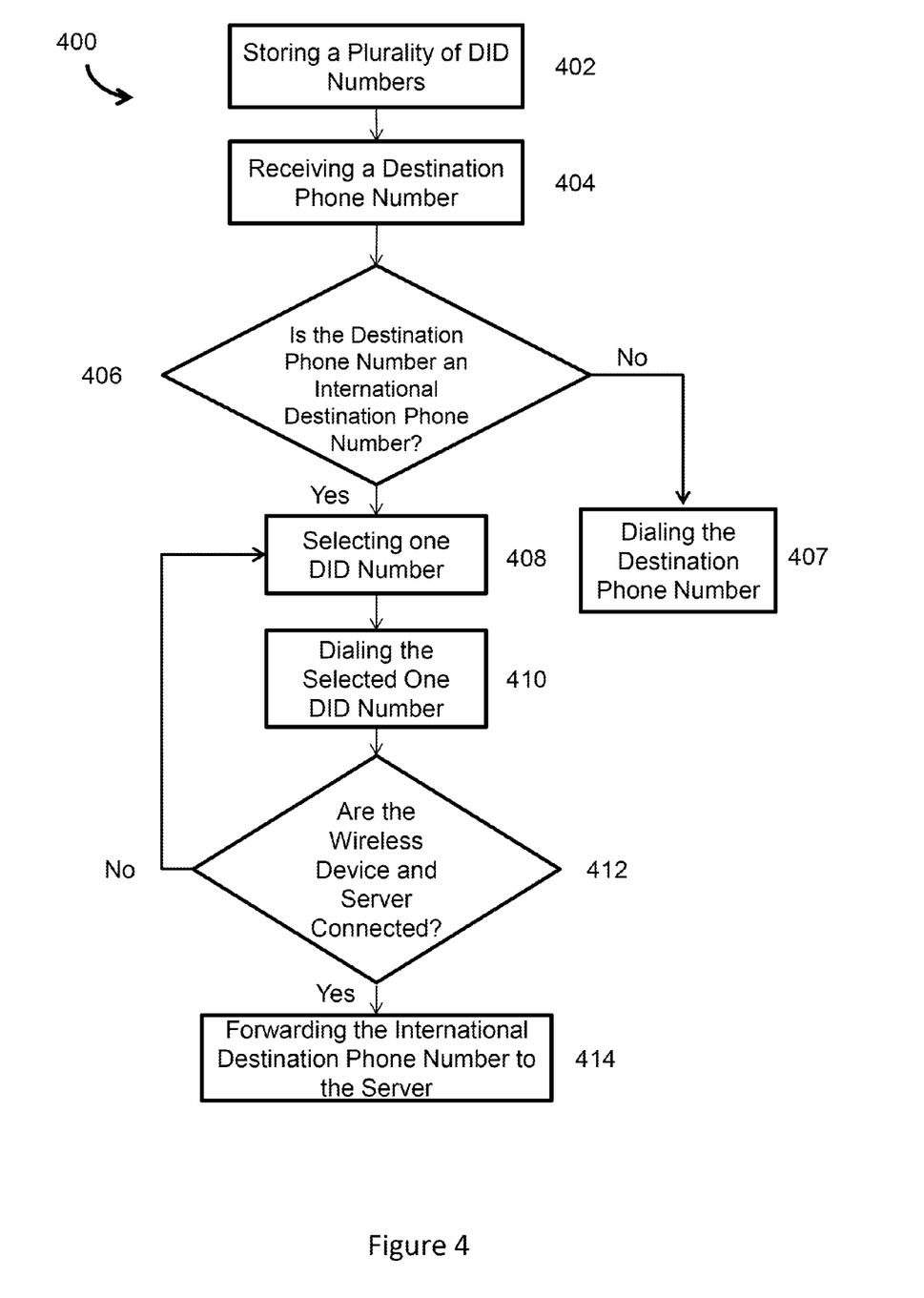
FIG. 4 illustrates a flowchart showing an exemplary process for selecting one of a plurality of direct inward dialing numbers to connect the wireless device to a destination associated with an international telephone number according to aspects of the disclosure.

FIG. 4 illustrates a flowchart showing an exemplary process 400 for selecting one of a plurality of direct inward dialing numbers to connect the wireless device 10 to a destination associated with an international telephone number according to aspects of the disclosure. One or more steps of the process 400 can be carried out by, for example, an electronic system such as the wireless device 10, the MNO Network 302 or 304, the MVNO cloud 306 and/or the exchange server 350.

Initially, a plurality of DID numbers are stored (step 402). In some aspects where the plurality of the DID numbers are stored in the wireless device 10, the plurality of the DID numbers can be stored in the DID memory 312 of the DID Selection Module 310, in the memory 20, in an application stored in the memory 20, and/or the SIM memory 24 of the wireless device 10. The DID numbers can be pre-stored in the wireless device 10 and may be updated in response to a request from the wireless device 10, in response to a particular action at the wireless device 10, such as the reception of an international destination phone number, and/or at predetermined time intervals. One or more DID numbers can be added to existing DID numbers stored in the wireless device 10 and/or can replace existing DID numbers stored in the wireless device 10.

In some aspects, the user of the wireless device 10 may enter one or more DID numbers into the wireless device 10 for storage. These one or more DID numbers can be added to existing DID numbers stored in the wireless device 10 and/or can replace existing DID numbers stored in the wireless device 10. The user can enter DID numbers from a promotional item, an advertisement, a calling card, a website, or the like.

In some aspects where the plurality of the DID numbers are stored outside of the wireless device 10, such as in the MVNO cloud 306 and/or in a non-transitory memory accessible to the wireless device 10, the wireless device 10 can receive one or more DID numbers, which can be temporarily or permanently stored. The one or more DID numbers can be received by the wireless device 10 in response to a request from the wireless device 10, in response to a particular action at the wireless device 10, such as the reception of an international destination phone number, and/or at predetermined time intervals.

In some aspects, the plurality of the DID numbers can be stored on the MNO Network 302 or 304 and/or in a non-transitory memory accessible to the MNO Network 302 or 304. The one or more DID numbers can be received by the wireless device 10 in response to a request from the wireless device 10, in response to a particular action at the wireless device 10, such as the reception of an international destination phone number, and/or at predetermined time intervals. The wireless device can temporarily or permanently store the DID numbers received from the MNO Network 302 or 304.

Each DID number can correspond to a particular exchange server, such as the exchange server 350, such that the wireless device 10 can access one of the exchange servers 350 through the one or more of the MNO Network 302 or 304 and/or the MVNO cloud 306. The exchange servers 350 may be a private branch exchange system, a fax server, or the like.

The wireless device 10 then receives a destination phone number (step 404). The wireless device 10 may receive the destination phone number from a user of the wireless device 10 or from an application executed on the wireless device 10. For example, the user may dial the destination phone number using a physical and/or virtual keypad, the user may dictate the destination phone number using the microphone of the wireless device 10, the user may select a destination phone number on a webpage displayed in a web browser being executed on the wireless device 10, an application being executed on the wireless device 10 may attempt to dial a destination phone number without user interaction or augmentation, or the like.

The destination phone number can be a domestic phone number, a toll-free phone number, a long-distance phone number, an international phone number, a premium-rate telephone number, a customer service phone number, or the like. The destination phone number can include one or more digits and can, preferably, include ten or more digits.

Following reception of the destination phone number, the wireless device 10 determines whether the destination phone number is an international destination phone number (step 406). In some aspects, to determine whether the destination phone number is an international phone number, the wireless device 10 can determine whether the destination phone number includes more than eleven digits.

In other aspects, to determine whether the destination phone number is an international phone number, the wireless device 10 can determine if the country code associated with the destination phone number differs from the country code associated with the wireless device 10. For example, if the MNO Network 302 or 304 is in the United States, the wireless device 10 can determine whether the country code associated with the destination phone number is equal to "1," which is the country code for the United States. In yet other implementations, the wireless device 10 can determine if the destination phone number includes an international exit code. For example, the wireless device 10 can determine whether the sequence "011," which is an example international exit code, is included in the destination phone number.

In some aspects, instead of the wireless device 10 determining whether the destination phone number is an international destination phone number in step 406, the wireless device 10 can determine whether the destination phone number is any other type of phone number in step 406. For example, the wireless device 10 can determine whether the destination phone number is a premium-rate telephone number in order to select a DID number suitable for connecting the wireless device 10 to a destination associated with the premium-rate telephone number.

If the wireless device determines that the destination phone number is not an international destination phone number, the wireless device 10 directly dials the received destination phone number without dialing a DID number before dialing the destination phone number (step 407). The wireless device 10 will thus connect to a destination associated with the destination phone number.

If the wireless device 10 determines that the destination phone number is an international phone number, the DID Number Selection Module 310 selects one DID number from among a plurality of stored DID numbers (step 408). The DID Number Selection Module 310 can select the one DID number without human interaction or augmentation.

In some aspects, the one DID number can be selected based on load balancing between each of the DID numbers. The load balancing can increase the likelihood that the wireless device 10 can connect with an exchange server 350 and also increase the likelihood of a high quality connection. In one example, the load between the plurality of the DID numbers can be balanced by sequentially dialing each of the plurality of DID numbers. As such, all of the wireless devices part of the MVNO cloud 306 and/or the MNO Network 302 or 304 will not simultaneously be attempting to access the same DID number, which would result in congestion of the exchange server 350 associated with that DID number. In another example, the load between the plurality of the DID numbers can be balanced by dialing a random DID number from among the plurality of DID numbers.

In yet another example, the DID Number Selection Module 310 of the wireless device 10 can receive the current load and/or remaining capacity of the exchange servers 350 associated with each of the plurality of DID numbers. In some aspects, the current load and/or remaining capacity of the exchange servers 350 can be received directly from the exchange servers 350, while in other aspects the current load and/or remaining capacity of the exchange servers 350 can be received from the MVNO cloud 306 or the MNO Network 302 or 304. The DID Number Selection Module 310 can then select the one DID number associated with the exchange server 350 having the lowest load and/or the highest remaining capacity.

In still another aspect, the DID Number Selection Module 310 of the wireless device 10 can receive the geographic location of the exchange servers 350 associated with each of the plurality of DID numbers. In some aspects, the geographic location of the exchange servers 350 can be received directly from the exchange servers 350, while in other aspects the geographic location of the exchange servers 350 can be received from the MVNO cloud 306 and/or the MNO Network 302 or 304. The DID Number Selection Module 310 can then select the one DID number associated with the exchange server 350 having the closest geographic location with respect to the wireless device 10 to reduce the latency between the wireless device 10 and the exchange server 350.

In some aspects, the DID Number Selection Module 310 selects one DID number associated with an exchange server 350 that is available. For example, the DID Number Selection Module 310 initially dials a first DID number to connect to a first exchange server 350. If the DID Number Selection Module 310 determines that the first exchange server 350 is unavailable, the DID Number Selection Module 310 will dial a second, different DID number. This process can be iteratively performed until the wireless device is connected to an available exchange server 350. The DID Number Selection Module 310 can determine that the first exchange server 350 is unavailable based on a signal, such as a busy tone or a Packet of Disconnect, received from the first exchange server 350.

Following selection of the one DID number, the wireless device 10 dials the selected DID number to connect the wireless device 10 with the exchange server 350 associated with the one DID number (step 410). The wireless device 10 can dial the selected DID number without human interaction or augmentation.

The wireless device 10 then determines whether it is connected to the exchange server 350 associated with the dialed DID number (step 412). In some aspects, the wireless device 10 will determine that it has established a connection with the exchange server 350 by receiving a signal, such as a dial tone or a communication packet, from the exchange server 350 notifying the wireless device 10 that the connection has successfully been established. In some aspects, the wireless device 10 may ping the exchange server 350 to see if the exchange server 350 is connected.

If the exchange server 350 is busy and/or at capacity, the wireless device 10 determines that it has not established a connection with the exchange server 350. If the wireless device 10 determines that it has not established a connection with the exchange server 350, the DID Number Selection Module 310 will iteratively select another, different DID number from among the plurality of DID numbers in step 408 until a connection between the wireless device 10 and the exchange server 350 is established.

If a connection between the wireless device 10 and the exchange server 350 associated with the dialed DID number is established, the wireless device 10 forwards the international destination phone number to the exchange server 350 (step 414). The international destination phone number can be forwarded without human interaction or augmentation. As such, the user of the wireless device 10 will seamlessly be connected to the destination associated with the international destination phone number through the exchange server 350.

In some aspects, the wireless device 10 can dial the international destination phone number so that the exchange server 350 receives the tones associated with the digits of the international destination phone number. In other aspects, the international destination phone number can be sent to the exchange server 350 in a data packet.

It is to be understood that the aspects of the disclosure are not limited to particular systems or processes described which may, of course, vary. It is also to be understood that the terminology used herein is for the purpose of describing particular aspects only, and is not intended to be limiting. As used in this specification, the singular forms "a," "an," and "the" include plural referents unless the content clearly indicates otherwise. Thus, for example, reference to "a memory" can include two or more memories.

Reference to "one aspect," "some aspects," "other aspects," or "one or more aspects" means that a particular feature, structure, or characteristic described in connection with the aspect is included in at least one aspect but not necessarily to the same aspect or a separate aspect that is mutually exclusive. Moreover, various features may be exhibited by some aspects and not by other aspects. Similarly, various requirements are described that may be requirements for some aspects but not other aspects.

A number of aspects have been described. Nevertheless, it will be understood that various modifications may be made without departing from the spirit and scope of the claims. For example, the wireless device 10 may not utilize a UICC or SIM card 22. The wireless device 10 may operate using any mobile operating system. The wireless device 10 may include internally stored rules of operation that may be changed together with other mobile communications devices within a select group via a broadcast message received from the MVNO cloud 306 or the MNO Network 302 or 304.

In another example, although the destination phone number and the international destination phone number are described as being phone numbers, they can be any identifiers of a destination. For example, they can be Internet Protocol ("IP") addresses, media access control ("MAC") addresses, or the like.

Although for the sake of clarity and simplicity, exemplary aspects are described in terms of a wireless device 10 used in a MVNO communications system, it should be understood that the invention is not limited to these exemplary aspects.

The wireless device 10 can be a smartphone operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system, or the like.

Further in accordance with various aspects of the invention, the methods described herein are intended for operation with dedicated hardware implementations including, but not limited to, PCs, PDAs, semiconductors, application specific integrated circuits (ASIC), programmable logic arrays, cloud computing devices, and other hardware devices configured to implement the methods described herein.

The invention may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

It should also be noted that the software implementations of the invention as described herein can be stored on a tangible, non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations comprising code segments are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the invention are apparent from the detailed specification, and, thus, it is intended by the appended claims to cover all such features and advantages of the invention which fall within the spirit and scope of the invention. Further, since numerous modifications and variations will readily occur to those skilled in the art, it is not desired to limit the invention to the exact construction and operation illustrated and described, and, accordingly, all suitable modifications and equivalents may fall within the scope of the invention.

What is claimed is:

1. A method for dialing an international number preceded by a direct inward dialing number utilizing a wireless device, the method comprising:

receiving, at the wireless device, a destination phone number to be dialed by the wireless device;

determining that the destination phone number is an international destination phone number;

selecting, in response to the determination that the destination phone number is an international destination phone number, one direct inward dialing number from among a plurality of direct inward dialing numbers, the one direct inward dialing number connecting the wireless device to a server;

dialing, by the wireless device, the one selected direct inward dialing number;

determining that a connection between the wireless device and the server has been established; and forwarding the international destination phone number to the server in response to the determination that the connection between the wireless device and the server has been established, wherein selecting the one direct inward dialing number from among the plurality of the direct inward dialing numbers comprises load balancing between each of direct inward dialing numbers; and wherein selecting the one direct inward dialing number from among the plurality of direct inward dialing numbers with the wireless device further comprises selecting the one direct inward dialing number associated with the server having the lowest load.

2. The method of claim 1, further comprising storing, on the wireless device, the plurality of direct inward dialing numbers.

3. The method of claim 2, wherein storing the plurality of direct inward dialing numbers on the wireless device comprises receiving, in response to the determination that the destination phone number is an international destination phone number, one or more available inward dialing numbers.

4. The method of claim 2, wherein storing the plurality of direct inward dialing numbers on the wireless device comprises adding or removing direct inward dialing numbers to or from the wireless device.

5. The method of claim 2, wherein storing the plurality of the direct inward dialing numbers on the wireless device comprises storing the plurality of direct inward dialing numbers on a subscriber identification module card.

6. The method of claim 2, wherein storing the plurality of direct inward dialing numbers on the wireless device comprises storing the plurality of direct inward dialing numbers on a memory of the wireless device.

7. The method of claim 2, wherein storing the plurality of direct inward dialing numbers on the wireless device comprises storing the plurality of direct inward dialing numbers in an application stored on a memory of the wireless device.

8. The method of claim 1, wherein load balancing between each of direct inward dialing numbers stored on the wireless device comprises sequentially dialing each of the plurality of the direct inward dialing numbers.

9. The method of claim 1, wherein load balancing between each of direct inward dialing numbers stored on the wireless device comprises receiving a load on each server associated with each of the plurality of direct inward dialing numbers.

10. A method for dialing an international number preceded by a direct inward dialing number utilizing a wireless device, the method comprising:
receiving, at the wireless device, a destination phone number to be dialed by the wireless device;
determining that the destination phone number is an international destination phone number;
selecting, in response to the determination that the destination phone number is an international destination phone number, one direct inward dialing number from among a plurality of direct inward dialing numbers, the one direct inward dialing number connecting the wireless device to a server;
dialing, by the wireless device, the one selected direct inward dialing number;
determining that a connection between the wireless device and the server has been established; and
forwarding the international destination phone number to the server in response to the determination that the connection between the wireless device and the server has been established,
wherein the server is a private branch exchange system; and
wherein selecting the one direct inward dialing number from among the plurality of direct inward dialing numbers with the wireless device further comprises selecting the one direct inward dialing number associated with the server having the lowest load.

11. The method of claim 1, further comprising determining that the destination phone number is not an international destination phone number.

12. The method of claim 11, further comprising dialing, by the wireless device and in response to the determination that the destination phone number is not an international destination phone number, the destination phone number without selecting the one direct inward dialing number.

13. The method of claim 1, wherein selecting the one direct inward dialing number from among the plurality of direct inward dialing numbers comprises:
dialing, by the wireless device, a first direct inward dialing number;
determining that the first direct inward dialing number is unavailable; and
selecting, in response to the determination that the first direct inward dialing number is unavailable, a second direct inward dialing number, the second direct inward dialing number being different from the first direct inward dialing number.

14. The method of claim 13, wherein determining that the first direct inward dialing number is unavailable comprises receiving a signal, from a server associated with the first direct inward dialing number, that the server is unavailable.

15. The method of claim 1, wherein dialing the one selected direct inward dialing number comprises dialing the one selected direct inward dialing number without human interaction or augmentation.

16. The method of claim 1, wherein forwarding the international destination phone number comprises forwarding the international destination phone number without human interaction or augmentation.

17. A wireless device comprising at least one processor connected to at least one memory, wherein the at least one processor is configured to:
receive a destination phone number to be dialed by the wireless device;
determine that the destination phone number is an international destination phone number;
select, in response to the determination that the destination phone number is an international destination phone number, one direct inward dialing number from among a plurality of direct inward dialing numbers, the one direct inward dialing number connecting the wireless device to a server;
dial the one selected direct inward dialing number;
determine that a connection between the wireless device and the server has been established; and
forward the international destination phone number to the server in response to the determination that the connection between the wireless device and the server has been established,
wherein the processor is configured to select the one direct inward dialing number from among the plurality of the direct inward dialing numbers utilizing load balancing between each of direct inward dialing numbers; and
wherein selecting the one direct inward dialing number from among the plurality of direct inward dialing numbers with the wireless device further comprises selecting the one direct inward dialing number associated with the server having the lowest load.

18. A non-transitory memory of a wireless device storing a computer program, the computer program comprising one or more code segments that, when executed, cause at least one processor to:

receive a destination phone number to be dialed by the wireless device; determine that the destination phone number is an international destination phone number;

select, in response to the determination that the destination phone number is an international destination phone number, one direct inward dialing number from among a plurality of direct inward dialing numbers, the one direct inward dialing number connecting the wireless device to a server;

dial the one selected direct inward dialing number;

determine that a connection between the wireless device and the server has been established; and forward the international destination phone number to the server in response to the determination that the connection between the wireless device and the server has been established, wherein the processor selects the one direct inward dialing number from among the plurality of the direct inward dialing numbers utilizing load balancing between each of direct inward dialing numbers; and wherein selecting the one direct inward dialing number from among the plurality of direct inward dialing numbers with the wireless device further comprises selecting the one direct inward dialing number associated with the server having the lowest load.

* * * * *